C. J. NUGENT.
LAMP-WICK TRIMMER.
No. 177,546. Patented May 16, 1876.
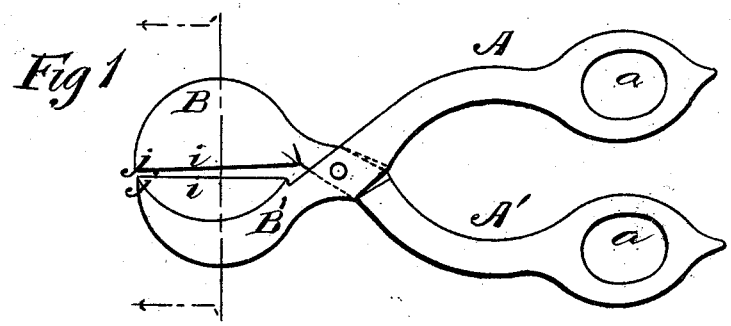
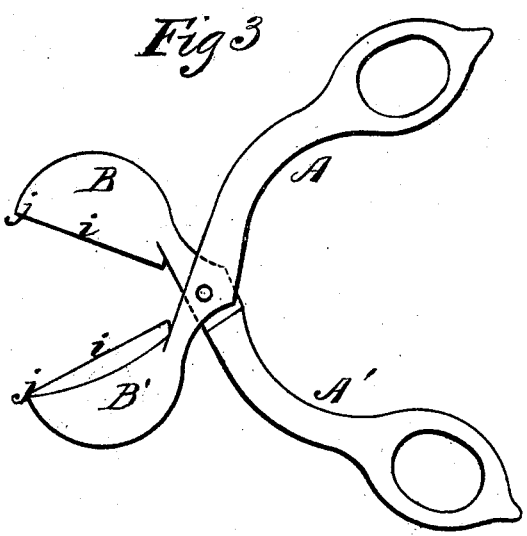

UNITED STATES PATENT OFFICE.

CLARENCE J. NUGENT, OF FOREST CITY, ARKANSAS.

IMPROVEMENT IN LAMP-WICK TRIMMERS.

Specification forming part of Letters Patent No. 177,546, dated May 16, 1876; application filed December 18, 1875.

*To all whom it may concern:*

Be it known that I, CLARENCE JEWELL NUGENT, of Forest City, in the county of St. Francis and State of Arkansas, have invented a new and valuable Improvement in Lamp - Wick-Trimmers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my lamp-wick trimmers closed. Fig. 2 is a transverse sectional view thereof; and Fig. 3 is a plan view of the same open.

This invention has relation to improvements in wick-trimming shears; and it consists in a pair of shears having semicircular cutting-blades, the under side of one of which is dished, and the other partially dished, the cutting-edge of each blade forming an obtuse angle with its handle, and the outer ends of the cutting-edges being brought nearer to each other than the inner or heel ends, whereby, in trimming the wick, a draw-cut inward is produced, the outer ends of the blades being brought in contact before the heel ends, as will be hereinafter more fully set forth.

In the annexed drawings, the letters A A' designate the arms of my improved shears, pivoted together in the usual manner, and provided with finger-loops a at one end, and cutting-blades B B' at the other. These blades are of semicircular form, or nearly so, and one of them is hollowed out upon its entire under side, forming a concave disk, b, when the two cutting-edges of the blades are brought together. The other blade, B', is only partly hollowed or dished near its cutting - edge. These cutting-edges i are made in the arc of a circle, and they pass each other in close contact, after the customary manner, so as to form a draw-cut. They also form, with the arms A A', an obtuse angle, as shown in Fig. 3, and the outer ends of the cutting-edges are nearer to each other than the heel ends, the effect of which is, that when the blades are brought together in the act of trimming a wick, the extreme outer ends j of the said cutting-edges will first be brought in contact, and a draw-cut inward instead of outward will be obtained. By this means, in trimming a thick wick, all liability to its slipping out from between the blades is effectually obviated, the cut portion of the wick will be carried inward toward the pivotal point of the handles, and an even, smooth cut will be obtained.

What I claim as new, and desire to secure by Letters Patent, is—

The pivoted blades B, the cutting-edges i of which form an obtuse angle with the handles A A', the outer ends of the cutting-edges being nearer to each other than the heel ends, substantially as and for the purpose set forth.

In testimony that I claim the above I have hereunto subscribed my name in the presence of two witnesses.

C. J. NUGENT.

Witnesses:
S. W. LIDDELL,
H. J. LONG.